US012472717B2

(12) United States Patent
Andreoli et al.

(10) Patent No.: US 12,472,717 B2
(45) Date of Patent: Nov. 18, 2025

(54) DEVICE AND MACHINE FOR FORMING BOXES WITH INTERNAL PARTITION WALL AND RELATIVE METHOD

(71) Applicant: I.M.A. INDUSTRIA MACCHINE AUTOMATICHE S.P.A., Ozzano Dell'Emilia (IT)

(72) Inventors: Daniele Andreoli, Ozzano Dell'Emilia (IT); Michele Musillo, Ozzano Dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 0 days.

(21) Appl. No.: 18/840,793

(22) PCT Filed: Feb. 16, 2023

(86) PCT No.: PCT/IB2023/051409
§ 371 (c)(1),
(2) Date: Aug. 22, 2024

(87) PCT Pub. No.: WO2023/161770
PCT Pub. Date: Aug. 31, 2023

(65) Prior Publication Data

US 2025/0187287 A1 Jun. 12, 2025

(30) Foreign Application Priority Data

Feb. 23, 2022 (IT) ........................ 102022000003332

(51) Int. Cl.
*B31B 50/44* (2017.01)
*B31B 50/46* (2017.01)
(Continued)

(52) U.S. Cl.
CPC ............ *B31B 50/444* (2017.08); *B31B 50/46* (2017.08); *B31B 50/624* (2017.08); *B31B 50/81* (2017.08);
(Continued)

(58) Field of Classification Search
CPC ..... B31B 50/444; B31B 50/624; B31B 50/46; B31B 2100/002; B31B 50/81; B31B 2120/25; B31D 5/0004
(Continued)

(56) References Cited

U.S. PATENT DOCUMENTS 3,367,246 A * 2/1968 Lucas .................. B31D 5/0013 493/391
3,659,505 A * 5/1972 Wasyluka ............... B31B 50/46 493/102
(Continued)

OTHER PUBLICATIONS

International Search Report dated Jun. 5, 2023 from counterpart PCT App No. PCT/IB2023/051409.

*Primary Examiner* — Anna K Kinsaul
*Assistant Examiner* — Nicholas E Igbokwe
(74) *Attorney, Agent, or Firm* — SHUTTLEWORTH & INGERSOLL, PLC; Timothy J. Klima

(57) ABSTRACT

A box forming device includes an internal partition wall including a positioning area to support a blank arriving from a magazine and positioned between a forming head movable along a rectilinear trajectory to intercept, in an operating position, a portion of the blank. A die receives the blank and forms an open box having a base and side walls defining a housing compartment. The forming head has an operating end for contact with the blank provided with a through seat extending transversely with respect to the rectilinear trajectory. A strap feeding member feeds a strap along a strap along a strap feeding direction in the through seat, which temporarily accommodates the strap. A strap retaining mem-
(Continued)

ber retains the strap in the through seat while the forming head moves towards the blank, and to release the strap in the compartment such that the strap forms a partition wall which separates two adjacent compartments.

14 Claims, 9 Drawing Sheets

(51) Int. Cl.

| | |
|---|---|
| ***B31B 50/62*** | (2017.01) |
| ***B31B 50/81*** | (2017.01) |
| ***B31B 100/00*** | (2017.01) |
| ***B31B 120/25*** | (2017.01) |

(52) U.S. Cl.
CPC ..... *B31B 2100/002* (2017.08); *B31B 2120/25* (2017.08)

(58) Field of Classification Search
USPC .............................................. 492/162, 90–92
See application file for complete search history.

(56) References Cited

U.S. PATENT DOCUMENTS

| | | | | | |
|---|---|---|---|---|---|
| 4,283,188 | A * | 8/1981 | Wingerter | B31B 50/624 | 493/126 |
| 4,398,901 | A * | 8/1983 | Campbell | B31B 50/00 | 493/90 |
| 8,323,165 | B2 * | 12/2012 | Atoui | B31B 50/00 | 493/391 |
| 2013/0140350 | A1 * | 6/2013 | Noferi | B65D 71/06 | 493/162 |

* cited by examiner

Fig.8
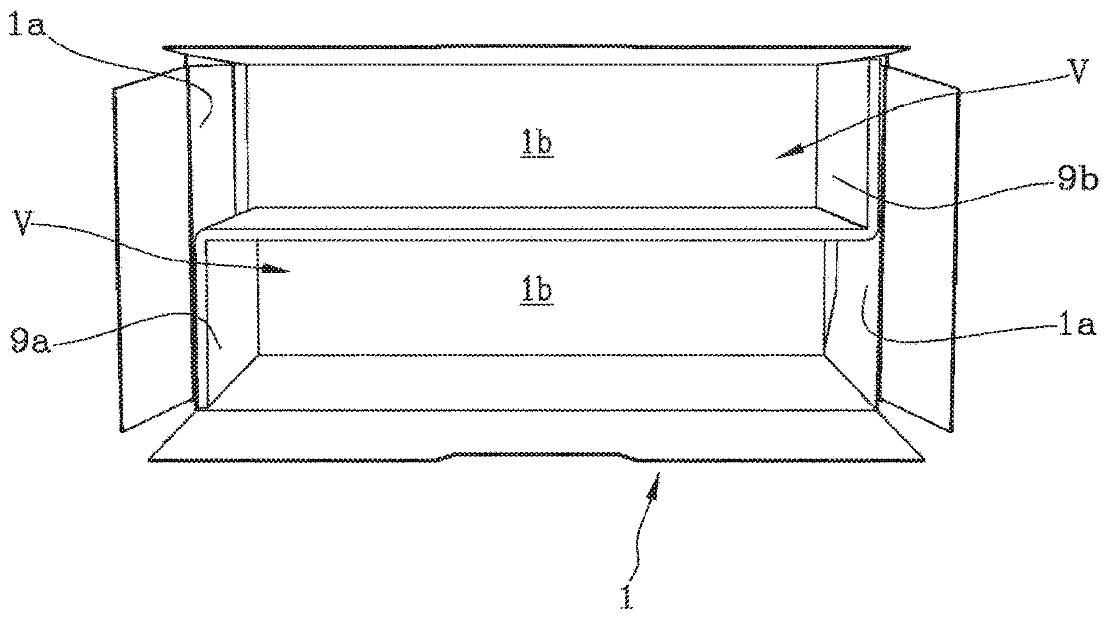
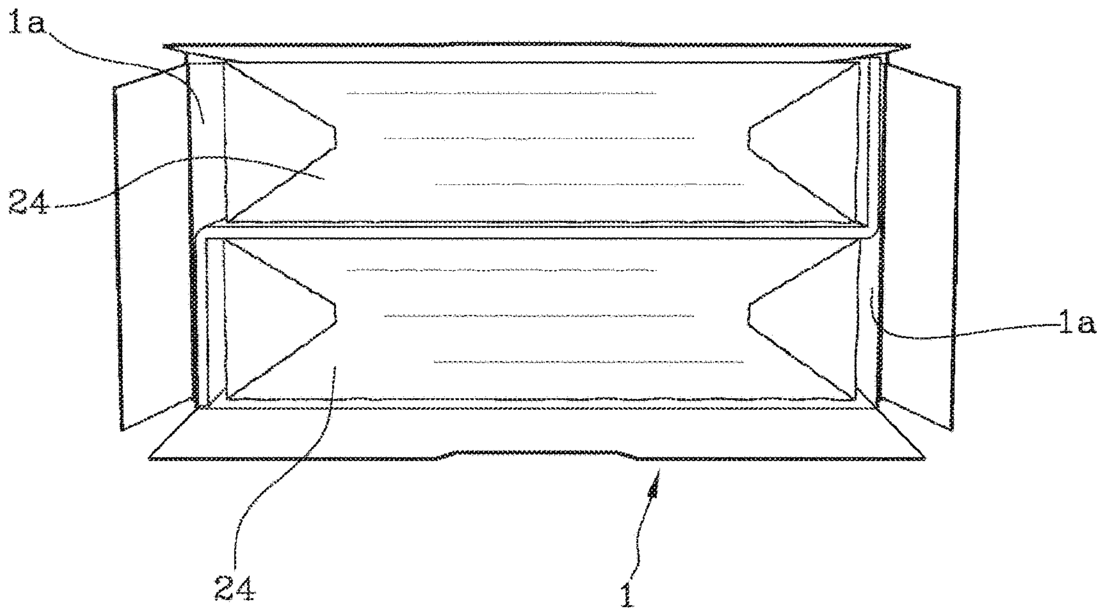
Fig.9

DEVICE AND MACHINE FOR FORMING BOXES WITH INTERNAL PARTITION WALL AND RELATIVE METHOD

This application is the National Phase of International Application PCT/IB2023/051409 filed Feb. 16, 2023 which designated the U.S.

This application claims priority to Italian Patent Application No. 102022000003332 filed Feb. 23, 2022, which application is incorporated by reference herein.

TECHNICAL FIELD

This invention relates to a device for forming boxes provided with an internal partition wall which will form a package containing, preferably, creamy products.

The invention also relates to a machine for forming packages provided with an internal partition wall as well as a method for forming boxes provided with an internal partition wall.

BACKGROUND ART

Packages are currently known on the market which are obtained starting from a blank made of paper material which is suitably folded to form a single carton or box having a compartment in which a wrapper (for example, made of aluminium) containing a product (such as, for example, a creamy food product such as cheese) is housed.

The current machines for forming these packages comprise:

a magazine for blanks made of paper material, wherein the blanks have longitudinal and transversal lines of weakness to define the walls of the box;

a device for forming cartons or boxes starting from the individual blanks fed by the magazine configured to obtain a fold, along the lines of weakness, to form individual boxes having a compartment defined by side walls, a bottom and a lid for closing the compartment, when the package is obtained;

a line for feeding cradles for housing boxes formed towards a station for forming and depositing the open and empty wrapper in the compartment of the box;

a station for dosing the creamy product in the wrapper;

a station for closing the wrapper, and a station for closing the box (that is to say, at least one folding of the lid onto the compartment).

Currently, the box forming device comprises:

an area for positioning and partly supporting the blank arriving from the magazine positioned between a forming head movable in both directions along a rectilinear trajectory and configured to intercept a portion of the blank (forming at least the base of the box formed) and a forming die with a tubular cross-section which is able to receive the blank pushed by the forming head and configured to fold the remaining part of the blank to define at least the side walls around the base of the box so as to obtain the housing compartment.

This system allows quick and easy formation of the box to be sent to the subsequent packaging line.

However, the current market requirements also require the possibility of having two different portions of creamy product enclosed in a respective wrapper inside each carton.

In order to be able to satisfy these requirements, there are prior art machines for the forming of cartons provided with an internal partition wall as described in patent documents U.S. Pat. Nos. 4,283,188 A and 4,398,901 A.

However, the above-mentioned machine should be widely modified in its structural layout and with extremely high overall costs.

AIM OF THE INVENTION

The aim of the invention is to provide a device for forming boxes to form a package provided with an internal partition wall which overcomes the above-mentioned drawbacks of the prior art.

In particular, the aim of the invention is to provide a device for forming boxes for forming a package provided with an internal partition wall in a flexible fashion and according to the various requirements for packaging the product contained, without substantially modifying the structure of the production line.

A further aim of the invention is to provide a machine for forming packages provided with an internal partition wall which is able to make different types of packages with two or more wrappers inside it, without modifying the layout of the machine.

Yet another aim of the invention is to propose a method for forming boxes provided with an internal partition wall.

Said aims are fully achieved by a device for forming boxes to form a package provided with an internal partition wall, by a machine for forming packages provided with an internal partition wall and by a method for forming boxes provided with an internal partition wall as characterised in the appended claims.

BRIEF DESCRIPTION OF THE DRAWINGS

These and other features of the invention will become more apparent from the following detailed description of a preferred, non-limiting embodiment of it, with reference to the accompanying drawings, in which:

FIG. 8 is a perspective view from above of a box formed with the device according to the preceding drawings;

FIG. 9 is a perspective view from above of the box of FIG. 8 housing two closed packages containing a product;

DETAILED DESCRIPTION OF PREFERRED EMBODIMENTS OF THE INVENTION

With reference to FIGS. 1 to 7, the device according to the invention, labelled 100 in its entirety, is used for forming boxes 1 provided with an internal partition wall which will form a package containing at least two separate wrappers. These wrappers may contain any type of product, in particular food products, for example of the creamy type.

Figure 10:
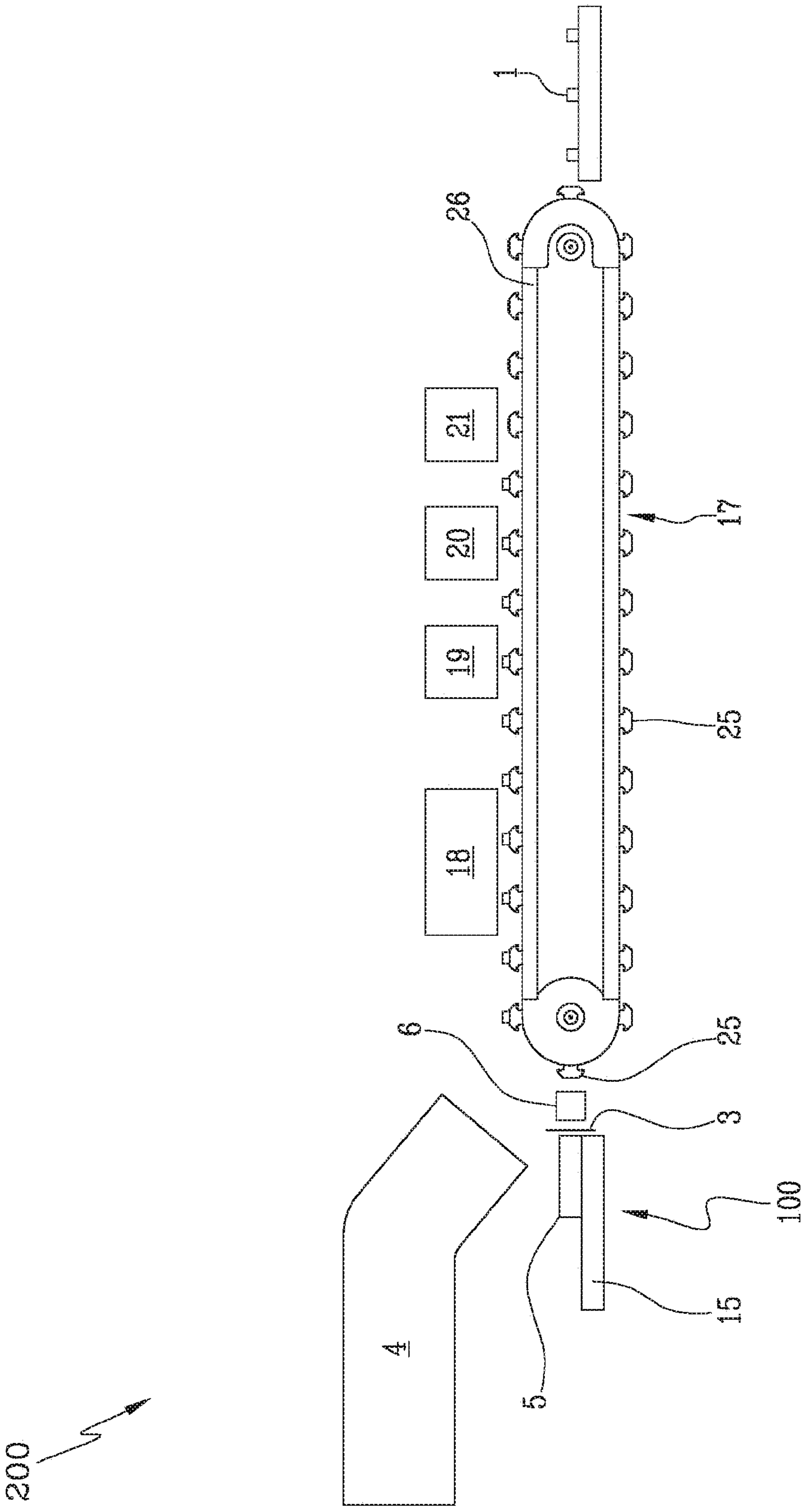
FIG. 10 shows a schematic side view of a machine for forming a package provided with an internal partition wall using the device of FIGS. 1-7.

The device 100 comprises a positioning area 2 for temporarily supporting a blank 3 (FIG. 3) arriving from a magazine 4 (FIG. 10).

The positioning area 2 is positioned between a forming head 5 and a forming die 6.

In the example illustrated, the forming head 5 and the forming die 6 are a pair in order to double the production. In the description below, for simplicity of description, reference will be made to only one of the components for each pair.

As illustrated, the forming head 5 movable in both directions along a rectilinear trajectory T and configured for intercepting, in an operating position, a portion of the blank 3.

As illustrated, the forming die 6 has a tubular cross-section and is configured to receive the blank 3 pushed by the forming head 5 and is configured to form an open box 1 having a base 1*b* and side walls 1*a* around the base 1*b* which define a housing compartment V.

Again as illustrated, the forming head 5 has an operating end for contact with the blank 3 provided with a through seat 7 extending transversely with respect to the rectilinear trajectory T of movement of the forming head 5.

As illustrated, the device 100 for forming boxes 1 also comprises a strap feeding member 8 configured to feed a strap 9, preferably in a flattened condition, preferably along a strap feeding direction D which is transversal with respect to the rectilinear trajectory T of movement of the forming head 5, in the through seat 7, which is configured to temporarily accommodate the strap 9.

The device 100 also comprises a strap retaining member 10 configured to retain the strap 9 in the through seat 7 while the forming head 5 moves towards the blank 3.

When the forming head 5 has entered the forming die 6, the strap 9 is released by the strap retaining member 10 in the housing compartment V of the box 1 just formed, in such a way that the forming head 5 can come out from the housing compartment V with the strap 9 remaining in the housing compartment V to form a partition wall which separates two adjacent compartments in the housing compartment V of the box 1 (see FIGS. 8 and 9).

In other words, the device 100 can split the compartment V of the box 1 directly through the operation for forming the box 1 without operations after the definition of the box, but during the movement of the forming head 5 carrying the strap 9.

Obviously, if several chambers are to be obtained inside the housing compartment V of the box 1, it is possible to make suitable modifications to the device 100 so that the forming head 5 can house two or more straps 9 simultaneously, simply by making several through seats 7 parallel to each other.

It should be noted that the strap 9 is configured to protrude from the through seat 7 (preferably from both sides of the seat 7).

The device 100 comprises a folding member 11 configured to intercept at least one end flap 9*a* or 9*b* of the strap 9 which protrudes from the through seat 7, during the movement of the forming head 5 towards the box forming die 6, in such a way as to fold the at least one end flap 9*a* or 9*b* transversely to the feeding direction D of the strap 9, so as to obtain an L-shaped configuration of the strap 9 before it is inserted into the housing compartment V.

Preferably, the folding member 11 is configured to fold a pair of opposite end flaps 9*a*, 9*b* protruding from opposite sides of the through seat 7 in such a way as to form a strap 9 having a Z-shaped configuration.

Preferably, the strap 9 has, near its two ends, pre-folding lines which facilitate the above-mentioned folding.

It should be noted that the folding member(s) 11 is/are fixed in a position such as to intercept the end flap(s) 9*a* and 9*b* of the strap 9 during the movement of the forming head 5 towards the forming die 6.

The folding member 11 is shaped to allow the folding of the intercepted flaps 9*a* and 9*b*.

In light of this, the folding member 11 may comprise two folding heads 11*a*, 11*b*, located on opposite sides of the transit zone of the forming head 5, and shaped in such a way as to fold the corresponding flap 9*a* or 9*b* in opposite directions during their intercepting whilst the head 5 moves towards the forming die 6 (FIGS. 4-7).

Figure 3:
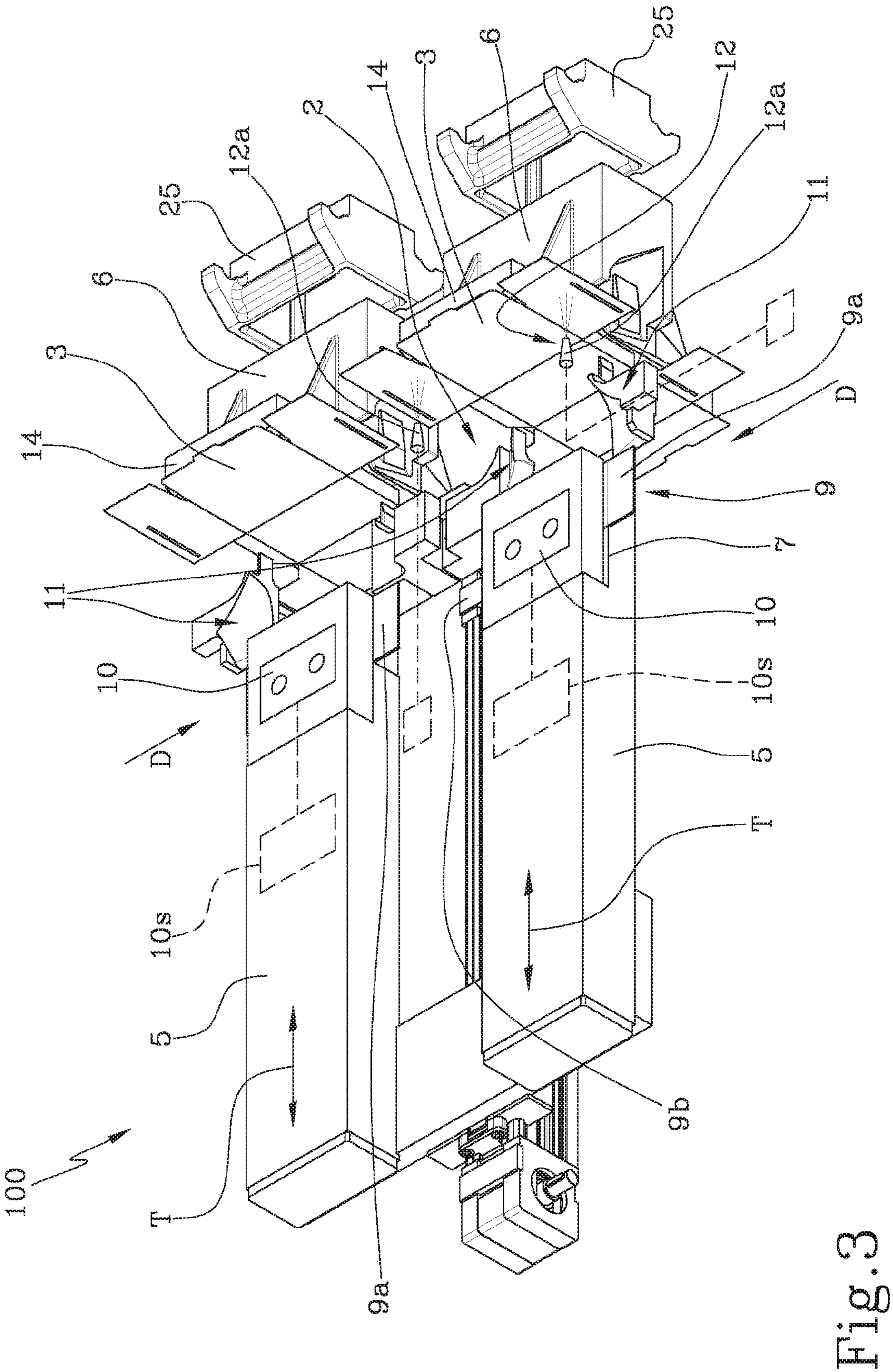
FIGS. 3 to 7 are perspective views of the device of FIG. 1 in different operating configurations.
Figure 4:
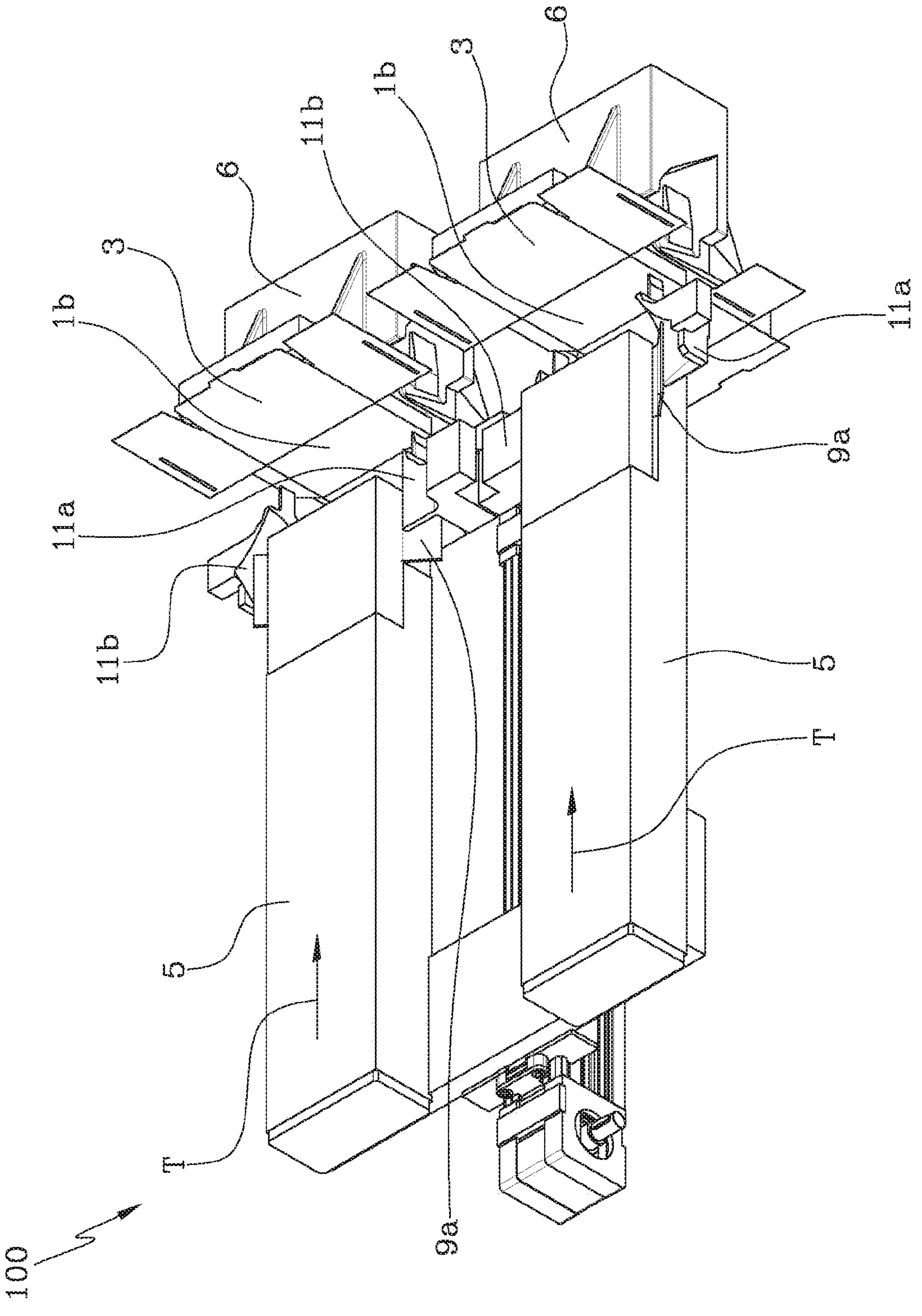
Figure 5:
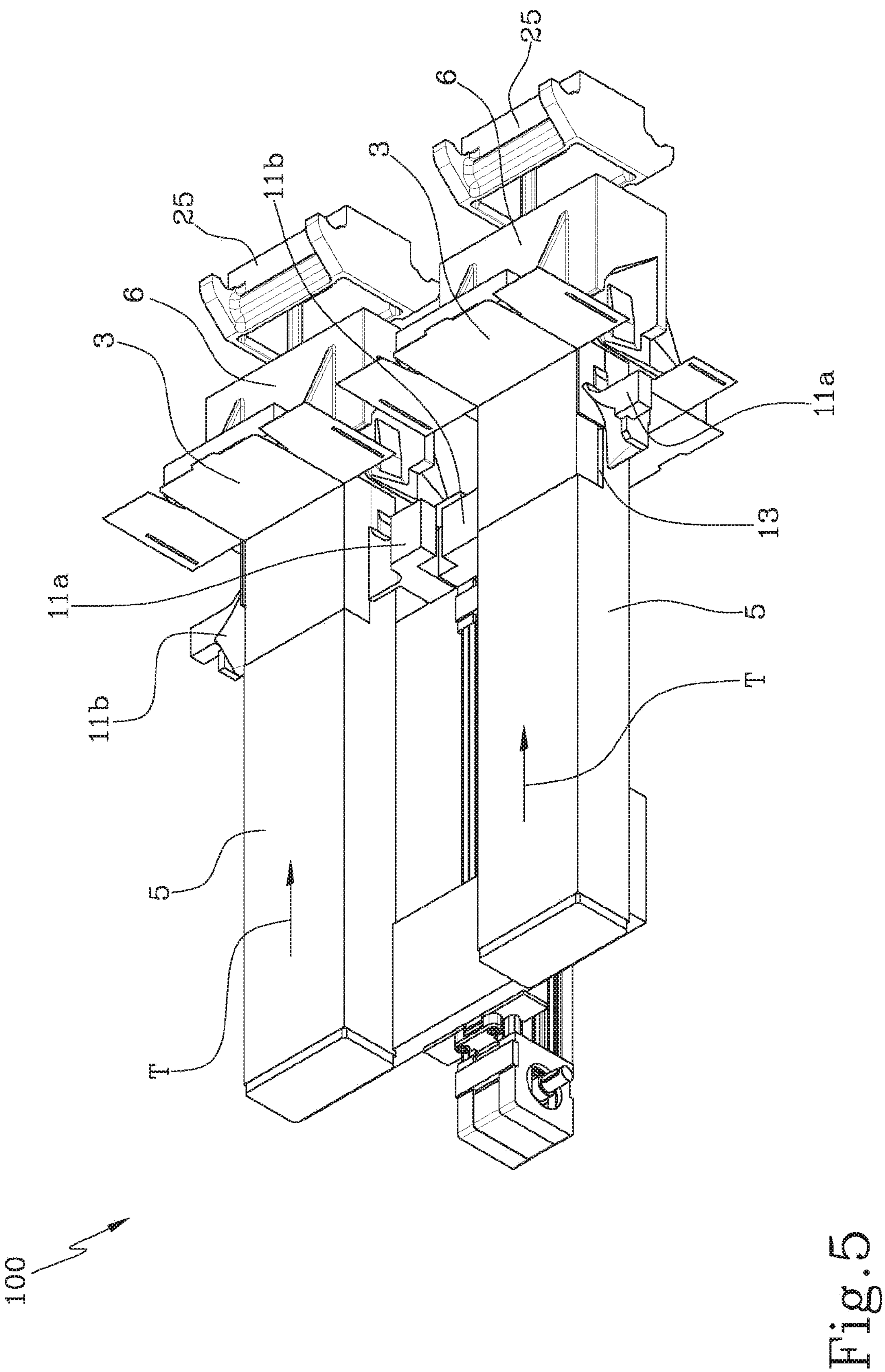
Figure 6:
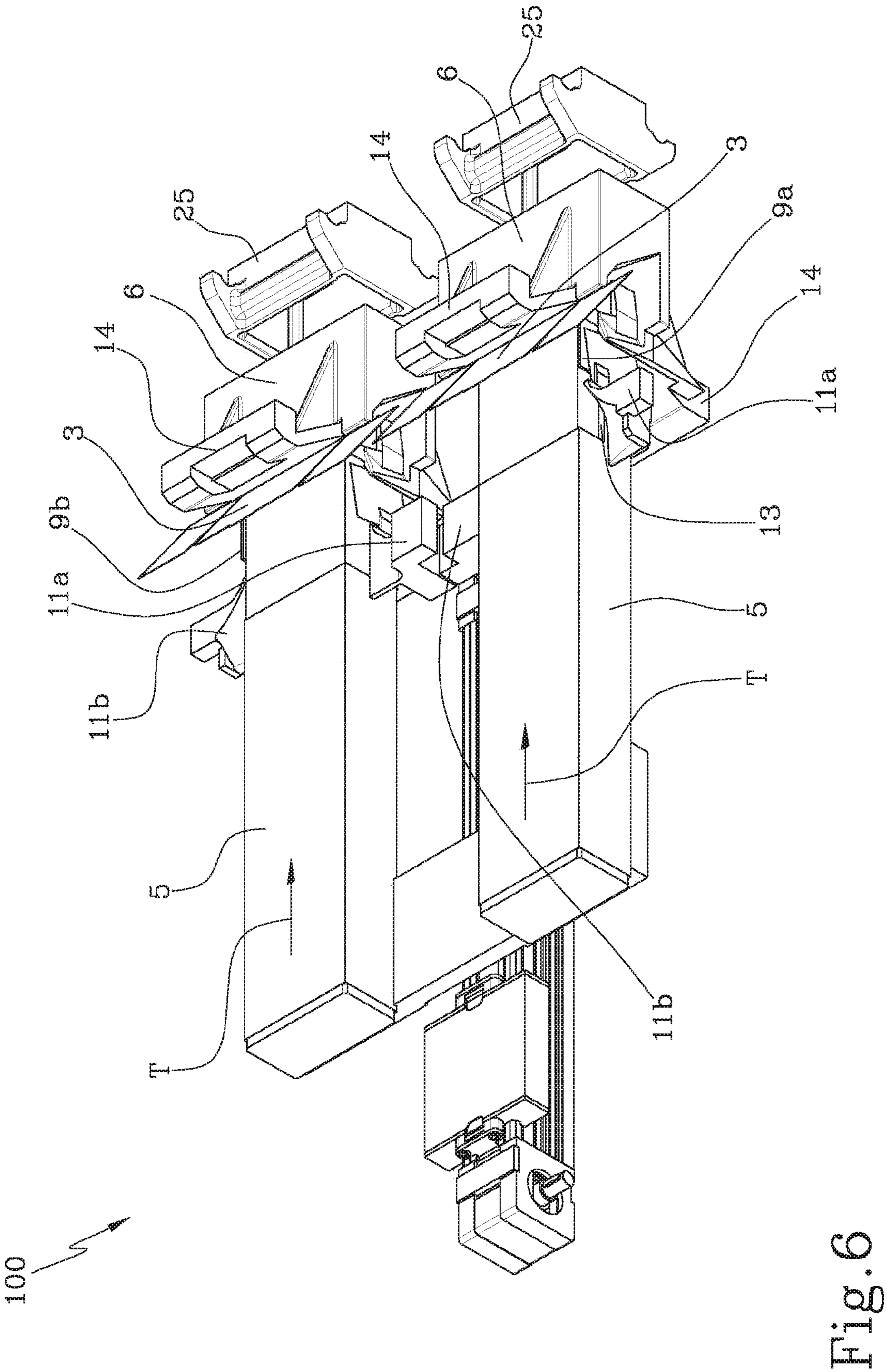
Figure 7:
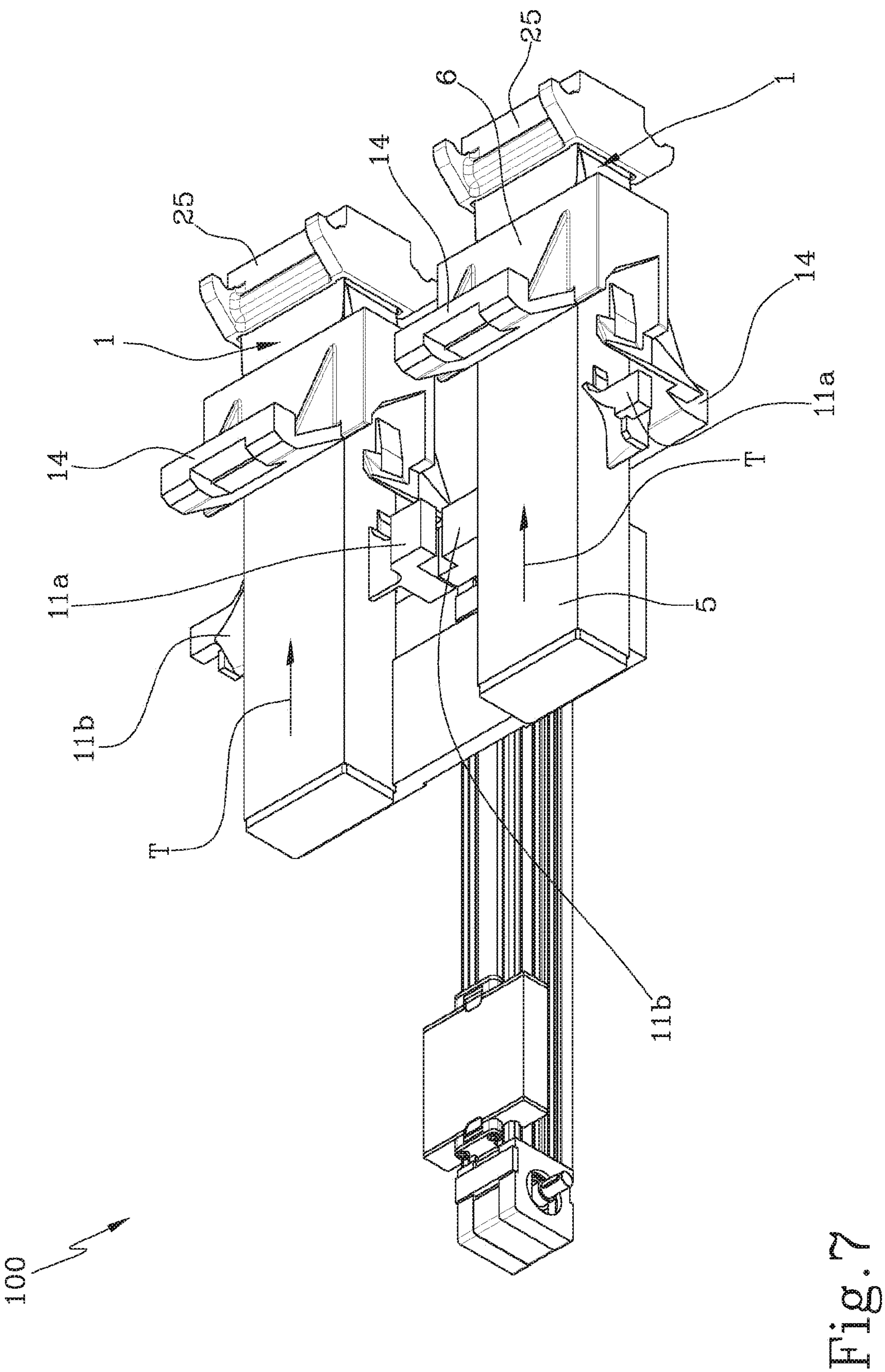

The device 100 also comprises a member 12 for distributing glue on the blank 3 and configured to distribute the glue in zones where the strap 9 is in contact with the inner faces of the box 1 (see FIG. 3).

The glue distribution member 12 is located above the blank 3, when located in the positioning area 2, and comprises, for example, two glue distribution nozzles 12*a* at corresponding zones of contact between the strap 9 and the inner faces of side walls 1*a* of the box 1.

The glue distribution member 12 may be mounted in a fixed or movable position.

Preferably, the forming head 5 is provided with at least one containing seat 13 configured and sized to contain the folded end flap 9*a* or 9*b* of the strap 9 before the blank 3 is pushed by the forming head 5 into the forming die 6.

In light of this, the forming head 5 is provided with two seats 13 for containing the flaps 9*a* and 9*b*.

The containment seats 13 are made directly on the forming head 5 in the form of recesses which allow the flaps 9*a* and 9*b* to be kept inside the dimensions of the compartment V to be formed in such a way as not to interfere with the formation of the box 1.

It should be noted that the forming die 6 has walls 14 protruding towards the forming head 5 having inclined surfaces configured to cause the folding of the blank 3 to obtain the side walls 1*a* of the box 1 whilst the forming head 5 enters the forming die 6.

The walls 14 also define a part of the area 2 for positioning the blank 3 arriving from the magazine 4.

Preferably, the strap retaining member 10 in the through seat 7 comprises suction means (illustrated as a block in FIG. 3).

The suction means are activated by a suction source 10*s* when the strap 9 is positioned in the through seat 7 and they are deactivated when the forming head 5 has formed the compartment V of the box 1, in such a way that the strap 9 can be positioned in the compartment V in the correct and stable manner.

As illustrated, the forming head 5 has a tubular shape with quadrangular cross-section with the operating end open towards the forming die 6.

In light of this, the through seat 7 is open on three sides of the operating end of the forming head 5.

The through seat 7 is formed by two side slots formed on the operating end of the forming head 5 and open at the open operating end.

Figure 1:
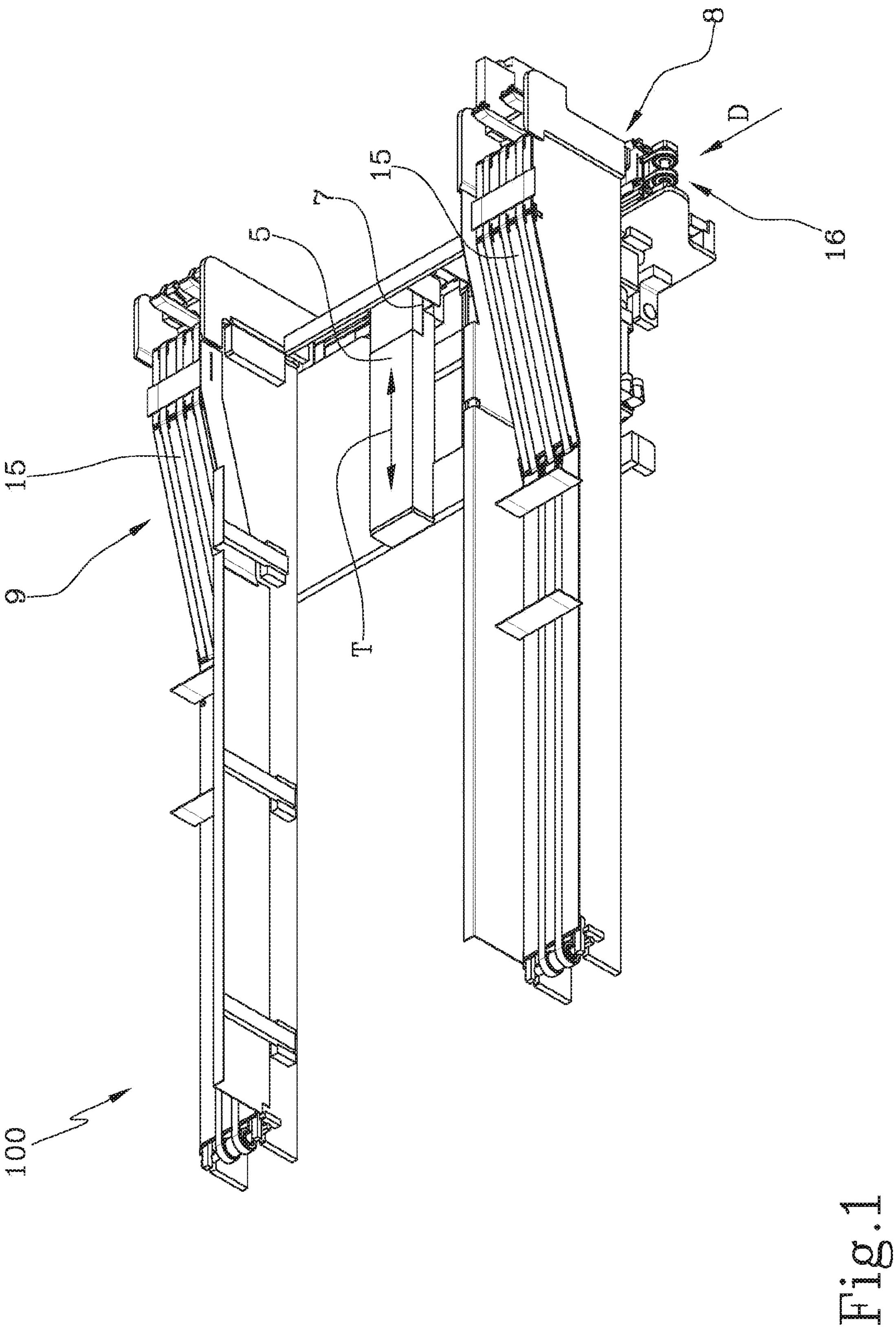
FIG. 1 is a perspective view, with some parts cut away to better illustrate others, of a device for forming boxes which will contain separate wrappers, according to the invention.
Figure 2:
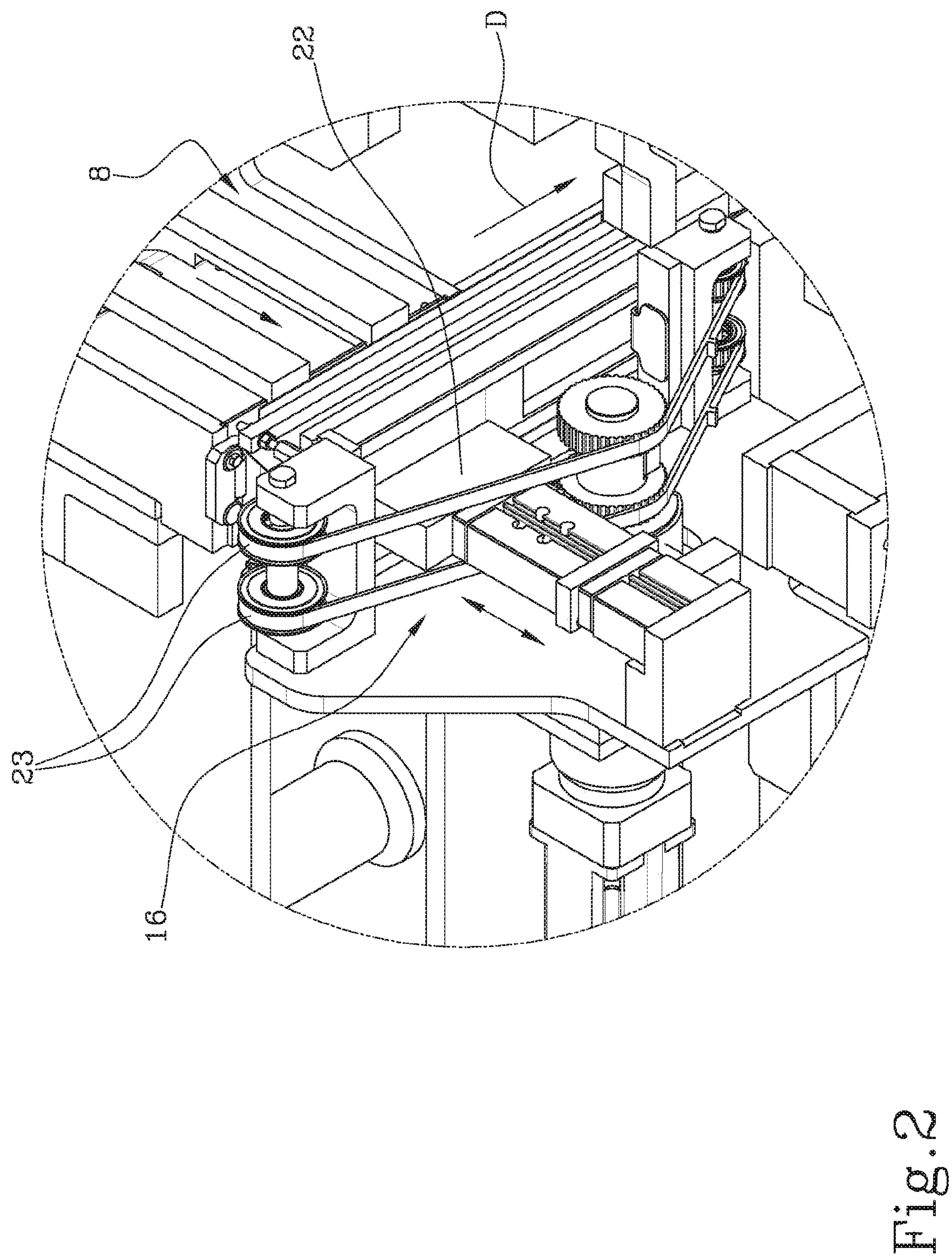
FIG. 2 illustrates an enlarged perspective view of a detail of the device of FIG. 1.

As illustrated in FIGS. 1 and 2, the member 8 for feeding straps 9 comprises a belt 15 for conveying the straps 9 along a direction parallel to the rectilinear trajectory T of movement of the forming head 5.

The conveyor 15 is configured to carry each strap 9 to a zone close to the forming head 5.

The feeding member 8 also comprises a strap gripping device 16 for the movement of one individual strap 9 at a time positioned close to the forming head 5 and configured to pick up the strap 9 from the conveyor belt 15 and position it in the through seat 7 of the forming head 5 along the direction D transversal to the rectilinear trajectory T of movement of the forming head 5.

As illustrated in FIGS. 1 and 2, the conveyor belt 15 moves individual straps 9, spaced from each other, up to a release point (positioned advanced with respect to the position of the forming head 5) and provided with a contact surface for the strap 9.

The strap gripping device 16 comprises a gripper head 22 (also using suction means) capable of picking up the strap 9 at the release point and bringing it into stable contact with at least one conveyor belt 23 positioned coplanar with the extension of the through seat 7.

The belt 23 then moves the strap 9 towards the forming head 5 until it is housed in the through seat 7.

The invention also provides a machine 200 for forming packages provided with an internal partition wall (see FIG. 10).

The machine (200) comprises:

- the blanks magazine 4 which contain the blanks 3, each having longitudinal and transversal lines of weakness to define at least a bottom 1*b* and side walls 1*a* of the box 1 to form at least one housing compartment V;
- a device 100 for forming boxes as described above;
- a line 17 for feeding the boxes 1 formed with the device 100 for forming boxes towards, in succession:
- a forming station 18 configured to deposit on opposite sides of the strap two wrappers 24, preferably made of soft material, open and empty in each chamber of the compartment of the box 1 separated from the strap 9;
- a dosing station 19 for dosing a product, preferably creamy food, in each wrapper 24;
- a first closing station 20 for closing each wrapper present, and
- a second closing station 21 for closing the box 1.

As illustrated in FIG. 10, each box 1 formed with the forming device 100 is housed in a suitable cradle 25 associated with a conveyor belt 26 which is closed in a loop and defining the feeding line 17.

The belt 26 carries each cradle 25 to the above-mentioned operating stations to perform the steps for completing the package.

It should be noted that the presence of the strap 9 in each box 1 is also functional to the final shape which will be given to the product fed into each wrapper 24, if the latter is made of soft material (see FIG. 9).

In other words, a wrapper made of soft material is placed in each of the two compartments, formed in the box by means of the strap, which will take a shape matching the corresponding compartment.

The nozzles then fill the wrappers with the creamy product (for example, processed cheese dosed with a very thin flow of product).

During filling, thanks to the strap, the product can be distributed uniformly in the wrappers thanks to its controlled deformation between the two compartments and allow the correct filling of both wrappers.

This will then allow a fast and precise closing of the wrappers to be obtained with a reduction in the overall operating times.

The invention also provides a method for forming boxes 1 provided with an internal partition wall, comprising the following steps:

- feeding a blank 3 from the blanks magazine 4 to the positioning area 2;
- driving the forming head 5 along the rectilinear trajectory T towards the positioning area 2;
- pushing the blank 3, placed in the positioning area 5, by means of the forming head 5 in the forming die 6, in such a way as to form the open box 1 having the base 1*b* and side walls 1*a* around the base 1*b* which define the housing compartment V,
- feeding the strap 9 along the strap feeding direction D into the through seat 7 of the forming head 5;
- retaining, by means of a strap retaining member 10, the strap 9 in the through seat 7, while the step of pushing the blank 3 is performed; then
- releasing the strap 9 within the housing compartment V of the box 1 forming the internal partition wall which separates two adjacent chambers; and finally
- pulling the forming head 5 out of the housing compartment V of the box 1.

The device for forming boxes thus obtained achieves the preset aims thanks to a simple and reliable structure with a high level of operating flexibility which allows the box forming device to form a package provided with an internal partition wall, to be quickly adapted to the production requirements of several types of boxes without having to modify the basic composition of the device.

The invention claimed is:

1. A box forming device for forming a box provided with an internal partition wall, comprising:

- a positioning area configured for temporarily supporting a blank coming from a blanks magazine and arranged between
- a forming head movable in both directions along a rectilinear trajectory and configured for intercepting, in an operating position, a portion of the blank and
- a box forming die having a tubular cross section positioned to receive the blank pushed by the forming head and configured to form an open box having a base and side walls around the base which define a housing compartment,
- wherein the forming head has an operative end configured to make contact with the blank and provided with a through seat extending transversely with respect to the rectilinear trajectory of movement of the forming head;
- a strap feeding member configured to feed a strap in the through seat, which is configured to temporarily accommodate the strap; and
- a strap retaining member configured to retain the strap within the through seat while the forming head moves toward the blank, and to release the strap when the forming head arrives in the box forming die, so that the strap remains within the housing compartment of the box forming an internal partition wall which separates two adjacent compartments.

2. The device according to claim 1, further comprising a folding member configured to intercept at least one end flap of the strap which protrudes from the through seat when the strap is retained by the strap retaining member, during the movement of the forming head towards the box forming die, to fold the at least one end flap transversely to a strap feeding direction before the forming head intercepts the blank, so as to obtain an L-shaped configuration of the strap.

3. The device according to claim 2, wherein the folding member is configured to fold a pair of opposite end flaps protruding from opposite sides of the through seat to obtain a Z-shaped configuration of the strap.

4. The device according to claim 2, wherein the forming head is provided with at least one containment seat configured and sized to contain the folded end flap of the strap before the blank is pushed by the forming head into the box forming die.

5. The device according to claim 2, wherein the folding member is fixed in a position to make contact with the end flap of the strap during the movement of the forming head towards the box forming die, said folding member being shaped to allow the bending of the flap intercepted.

6. The device according to claim 1, and further comprising a gluing member configured for distributing glue on the blank on zones where the strap will make contact with the box.

7. The device according to claim 1, wherein the box forming die has walls projecting towards the forming head having inclined surfaces configured to cause the folding of the blank to obtain the side walls of the box while the forming head enters into the box forming die.

8. The device according to claim 1, wherein the strap retaining member comprises suction means configured to temporarily retain the strap within the through seat, while the forming head moves toward the blank.

9. The device according to claim 1, wherein the through seat is open on three sides of the operating end of the forming head.

10. The device according to claim 1, wherein the strap feeding member further comprises a conveyor configured to convey the strap to the forming head; and a strap gripping device being positioned and configured to pick up the strap from the conveyor and position the strap in the through seat of the forming head.

11. The device according to claim 10, wherein said conveyor is configured to move the strap along a direction which is substantially parallel to the rectilinear trajectory of movement of the forming head.

12. The device according to claim 1, wherein a strap feeding direction is transverse to the rectilinear trajectory of movement of the forming head.

13. A machine for forming packages provided with internal partition walls comprising:

a blanks magazine configured to hold blanks;

the box forming device according to claim 1;

a box feeding line for feeding the box formed with the box forming device towards, in succession:

a forming station configured to lay an open and empty wrapper in each chamber of the housing compartment of the box separated by the strap;

a dosing station for dosing a product into each wrapper;

a first closing station for closing each wrapper; and a second closing station for closing the box.

14. A method for forming boxes provided with an internal partition wall, comprising the following steps:

feeding a blank from a blanks magazine to a positioning area;

driving a forming head along a rectilinear trajectory towards the positioning area;

pushing the blank, placed in the positioning area, by means of the forming head into a box forming die having a tubular cross section, to form an open box having a base and side walls around the base which define a housing compartment, feeding a strap along a strap feeding direction into a through seat provided in the forming head, said through seat extending transversely with respect to the rectilinear trajectory;

retaining, with a strap retaining member, the strap in the through seat, while said step of pushing the blank is performed; then releasing the strap within the housing compartment of the box forming an internal partition wall which separates two adjacent chambers; and finally pulling the forming head out of the housing compartment of the box.

* * * * *